United States Patent
Nakagawa et al.

(10) Patent No.: US 11,709,718 B2
(45) Date of Patent: Jul. 25, 2023

(54) BARRIER SYNCHRONIZATION CIRCUIT, BARRIER SYNCHRONIZATION METHOD, AND PARALLEL INFORMATION PROCESSING APPARATUS

(71) Applicant: FUJITSU LIMITED, Kawasaki (JP)

(72) Inventors: Kanae Nakagawa, Sagamihara (JP); Masaki Arai, Kawasaki (JP); Yasumoto Tomita, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 282 days.

(21) Appl. No.: 17/013,896

(22) Filed: Sep. 8, 2020

(65) Prior Publication Data

US 2021/0073048 A1    Mar. 11, 2021

(30) Foreign Application Priority Data

Sep. 11, 2019  (JP) .............................. JP2019-165768

(51) Int. Cl.
*G06F 9/46* (2006.01)
*G06F 9/52* (2006.01)
*G06F 9/48* (2006.01)

(52) U.S. Cl.
CPC .............. *G06F 9/522* (2013.01); *G06F 9/485* (2013.01)

(58) Field of Classification Search
CPC ................................ G06F 9/522; G06F 9/485
See application file for complete search history.

(56) References Cited

U.S. PATENT DOCUMENTS

| 10,013,283 | B1* | 7/2018 | Connolly | ............. G06F 12/0888 |
| 2014/0007111 | A1* | 1/2014 | Targowski | .............. G06F 9/505 |
| | | | | 718/102 |
| 2015/0227429 | A1 | 8/2015 | Henry et al. | |
| 2020/0004648 | A1* | 1/2020 | Xu | ......................... G06F 9/4856 |
| 2020/0410471 | A1* | 12/2020 | Tribble | .................. G06Q 20/24 |

FOREIGN PATENT DOCUMENTS

| JP | 2016-62388 A | 4/2016 |
| JP | 2016-524748 A | 8/2016 |
| JP | 2017-16250 A | 1/2017 |
| WO | 2015/118376 A1 | 8/2015 |

OTHER PUBLICATIONS

Extended European Search Report dated Feb. 12, 2021 for corresponding European Patent Application No. 20195270.2, 11 pages.

* cited by examiner

*Primary Examiner* — Tammy E Lee
(74) *Attorney, Agent, or Firm* — Fujitsu Patent Center

(57) ABSTRACT

A barrier synchronization circuit that performs barrier synchronization of a plurality of processes executed in parallel by a plurality of processing circuits, the barrier synchronization circuit includes a first determination circuit configured to determine whether the number of first processing circuits among the plurality of the processing circuits is equal to or greater than a first threshold value, the first processing circuits having completed the process, and an instruction circuit configured to instruct a second processing circuit among the plurality of the processing circuits to forcibly stop the process when it is determined that the number is equal to or greater than the first threshold value by the first determination circuit, the second processing circuit having not completed the process.

11 Claims, 7 Drawing Sheets

```
#pramga omp parallel for
for (i = 0; i < N; i++) {
...
}
#pragma omp barrier
```

FIG. 4B

```
set_AC_parameter(m, c)
start_AC_region(mode)
#pragma omp parallel for
for (i = 0; i < N; i++) {
...
}
#pragma omp barrier
end_AC_region(mode)
if (mode == 2) {
get_AC_value(&S,&M,&E);
}
```

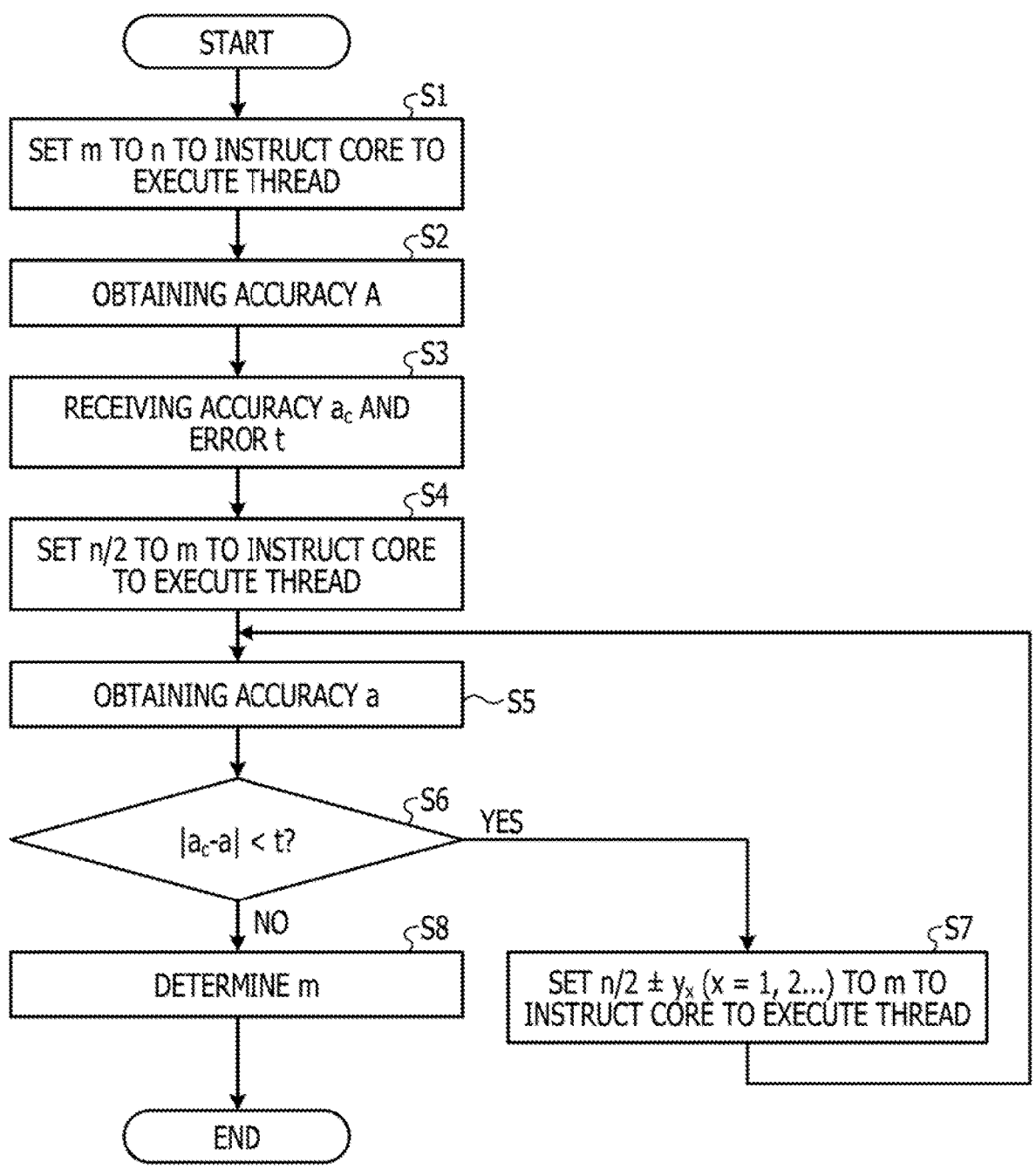

BARRIER SYNCHRONIZATION CIRCUIT, BARRIER SYNCHRONIZATION METHOD, AND PARALLEL INFORMATION PROCESSING APPARATUS

CROSS-REFERENCE TO RELATED APPLICATION

This application is based upon and claims the benefit of priority of the prior Japanese Patent Application No. 2019-165768, filed on Sep. 11, 2019, the entire contents of which are incorporated herein by reference.

FIELD

The embodiments discussed herein are related to a barrier synchronization circuit, a barrier synchronization method, and a parallel information processing apparatus.

BACKGROUND

In a parallel information processing apparatus in which a plurality of processing units perform a parallel process while synchronizing with each other, there is barrier synchronization as a method of synchronizing with each other. Here, the processing unit is a unit for using the processing apparatus. For example, a core of a central processing unit (CPU) is a processing apparatus, and a thread is a processing unit. The parallel information processing apparatus has a plurality of cores, and each core executes an assigned thread.

FIG. 7 is a diagram for explaining barrier synchronization. In FIG. 7, an ith (i is an integer of 1 or more) process is performed in parallel in threads #1 to #n (n is an integer of 2 or more), and the latest process is completed in the thread #n. As illustrated in FIG. 7, in the barrier synchronization, the threads other than the latest thread #n wait until the ith process is completed in the thread #n, and when the ith process is completed in the thread #n, a (i+1)th process is started in the threads #1 to #n.

As a technique of the related art, there is a processor that recovers from an excessive approximation calculation error when approximation calculation is performed. The processor includes a storage configured to receive a snapshot of a state of the processor prior to performing a set of calculations in the approximation, and an indicator indicating an amount of error accumulated while the set of calculations is performed in the approximation. When the processor detects that the amount of accumulated error exceeds an error limit, a state of the processor is restored from the storage to the snapshot.

Japanese National Publication of International Patent Application No. 2016-524748 is disclosed as related art.

SUMMARY

According to an aspect of the embodiments, a barrier synchronization circuit includes: a first determination circuit configured to determine whether the number of first processing circuits among a plurality of the processing circuits is equal to or greater than a first threshold value, the first processing circuits having completed the process, and an instruction circuit configured to instruct a second processing circuit among the plurality of the processing circuits to forcibly stop the process when it is determined that the number is equal to or greater than the first threshold value by the first determination circuit, the second processing circuit having not completed the process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram for explaining AC parallelization according to an example;

FIG. 4A is diagram illustrating an example of a program for designating AC parallelization;

FIG. 4B is diagram illustrating an example of a program for designating AC parallelization;

FIG. 5 is a flowchart illustrating a flow of a process in which a setting circuit determines a threshold value m;

DESCRIPTION OF EMBODIMENT

Hereinafter, examples of a barrier synchronization circuit, a barrier synchronization method, and a parallel information processing apparatus disclosed in the present application will be described in detail with reference to the drawings. The examples do not limit the disclosed technique.

Figure 1:
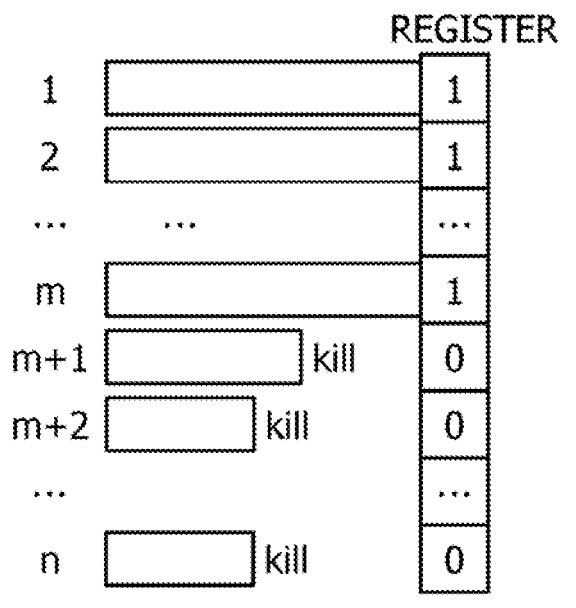

First, approximate computing (AC) parallelization according to an example will be described. FIG. 1 is a diagram for explaining the AC parallelization according to the example. In FIG. 1, a register indicates processing states of n threads. A bit corresponding to a thread that completes a process is 1, and a bit corresponding to a thread that does not complete a process is 0.

As illustrated in FIG. 1, in the AC parallelization according to the example, when the process is completed in m ($1 \leq m < n$) of n threads, the barrier synchronization circuit forcibly stops (kills) (n-m) threads in which the process is not completed.

As described above, in the AC parallelization according to the embodiment, the barrier synchronization circuit forcibly stops the (n-m) threads in which the process is not completed, and does not wait for the completion of the process of the (n-m) threads, Therefore, it is possible to shorten a waiting time and improve a processing speed. In an optimization problem such as an LSI arrangement and wiring problem, a lithography pattern creation problem, and a delivery plan problem in which a certain degree of error is allowed, it is possible to improve the processing speed by the AC parallelization according to the example. For example, in a genetic algorithm (GA), when a process for generating an individual of the ith generation in the ith process is performed in parallel by the n threads, the accuracy is lowered by forcibly stopping the (n-m) threads in each generation, but the processing speed is improved.

Figure 2:
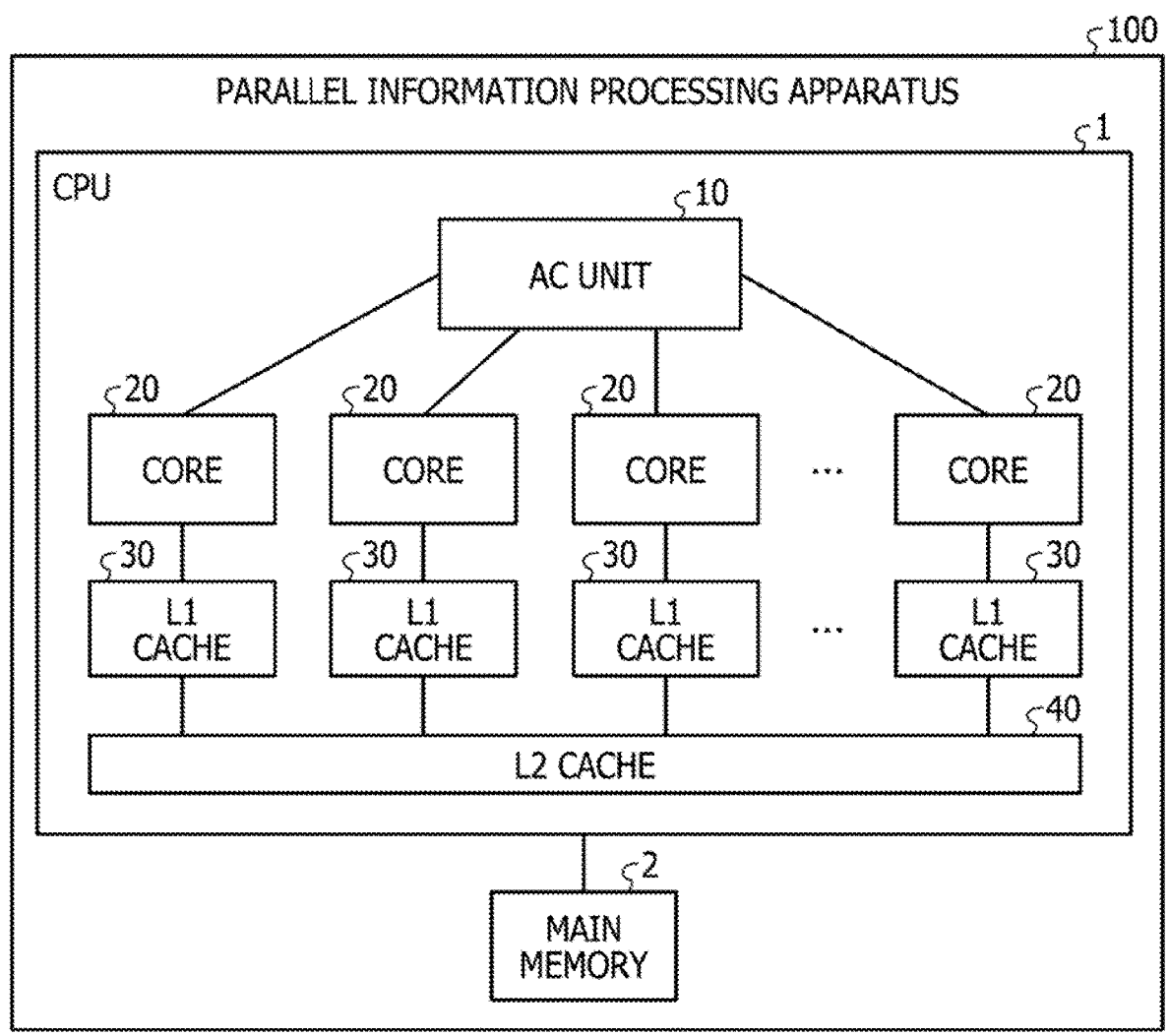
FIG. 2 is a diagram illustrating a configuration of a parallel information processing apparatus according to an example.

Next, a configuration of the parallel information processing apparatus according to the embodiment will be described. FIG. 2 is a diagram illustrating a configuration of a parallel information processing apparatus according to an embodiment. As illustrated in FIG. 2, a parallel information processing apparatus 100 according to the embodiment includes a CPU 1 and a main memory 2. The CPU 1 is a central processing unit that executes a program. The main memory 2 is a random-access memory (RAM) that stores the program executed by the CPU 1 and data used in the program. The parallel information processing apparatus 100 may include a plurality of CPUs 1 and main memories 2.

The CPU 1 includes an AC unit 10, n cores 20, n L1 caches 30, and an L2 cache 40. The AC unit 10 is coupled to each core 20. Each core 20 is coupled to a corresponding L1 cache 30. Each L1 cache 30 is coupled to the L2 cache 40.

The AC unit 10 is a barrier synchronization circuit that is notified of the completion of the process from the core 20 where the thread, in which the process is completed, operates and performs barrier synchronization. The AC unit 10 performs the process based on the mode.

When the mode is 0, the AC unit 10 does not perform the AC parallelization but performs normal barrier synchronization. For example, the AC unit 10 waits for the completion of the process to be notified from all the cores 20.

When the mode is 1, if the AC unit 10 is notified of the completion of the process from the core 20 where the thread, in which the process is completed, operates, the AC unit 10 determines whether or not the number of threads, in which the process is completed, is equal to or greater than a threshold value m. Then, when the number of threads, in which the process is completed, is equal to or greater than the threshold value m, the AC unit 10 determines that a synchronization condition is satisfied and transmits a forced stop signal to the core 20 where the process is not completed.

Further, when the AC unit 10 is notified of the completion of the process from the core 20 where the thread, in which the process is completed for the first time, operates, the AC unit 10 starts counting the number of clocks. Then, the AC unit 10 determines whether or not the number of clocks is equal to or greater than a threshold value c (c is a positive integer). When the number of clocks is equal to or greater than the threshold value c, the AC unit 10 determines that the synchronization condition is satisfied, and transmits the forced stop signal to the core 20 where the process is not completed.

When the mode is 2, the AC unit 10 collects data on the AC parallelization. The AC unit 10 collects a time s at which any one of the cores 20 completes the process for the first time, a time $m_t$ at which m or more cores 20 complete the process, and a time e at which all the cores 20 complete the process. The collected time s, time $m_t$, and time e are taken out from a program, for example.

The core 20 is a processing apparatus that performs the process. The core 20 executes a thread. When the process of the thread is completed, the core 20 notifies the AC unit 10 of the completion of the process of the thread. Further, when the core 20 receives the forced stop signal from the AC unit 10, the core 20 forcibly stops the thread. However, the core 20 may receive an estimated value of a processing result of the thread together with the forced stop signal. In this case, the thread may perform a next process using the estimated value.

The L1 cache 30 is a cache that stores some of the instructions and data stored in the main memory 2. The core 20 reads an instruction and data from the L1 cache 30 and executes the instruction. When there is no instruction or data to be accessed by the core 20, the L1 cache 30 acquires an instruction or data from the L2 cache 40.

The L2 cache 40 is a cache that stores some of the instructions and data stored in the main memory 2. The L2 cache 40 has a larger capacity and a slower access speed than those of the L1 cache 30. When there is no instruction or data to be accessed by the L1 cache 30, the L2 cache 40 acquires the instruction or data from the main memory 2.

Figure 3:
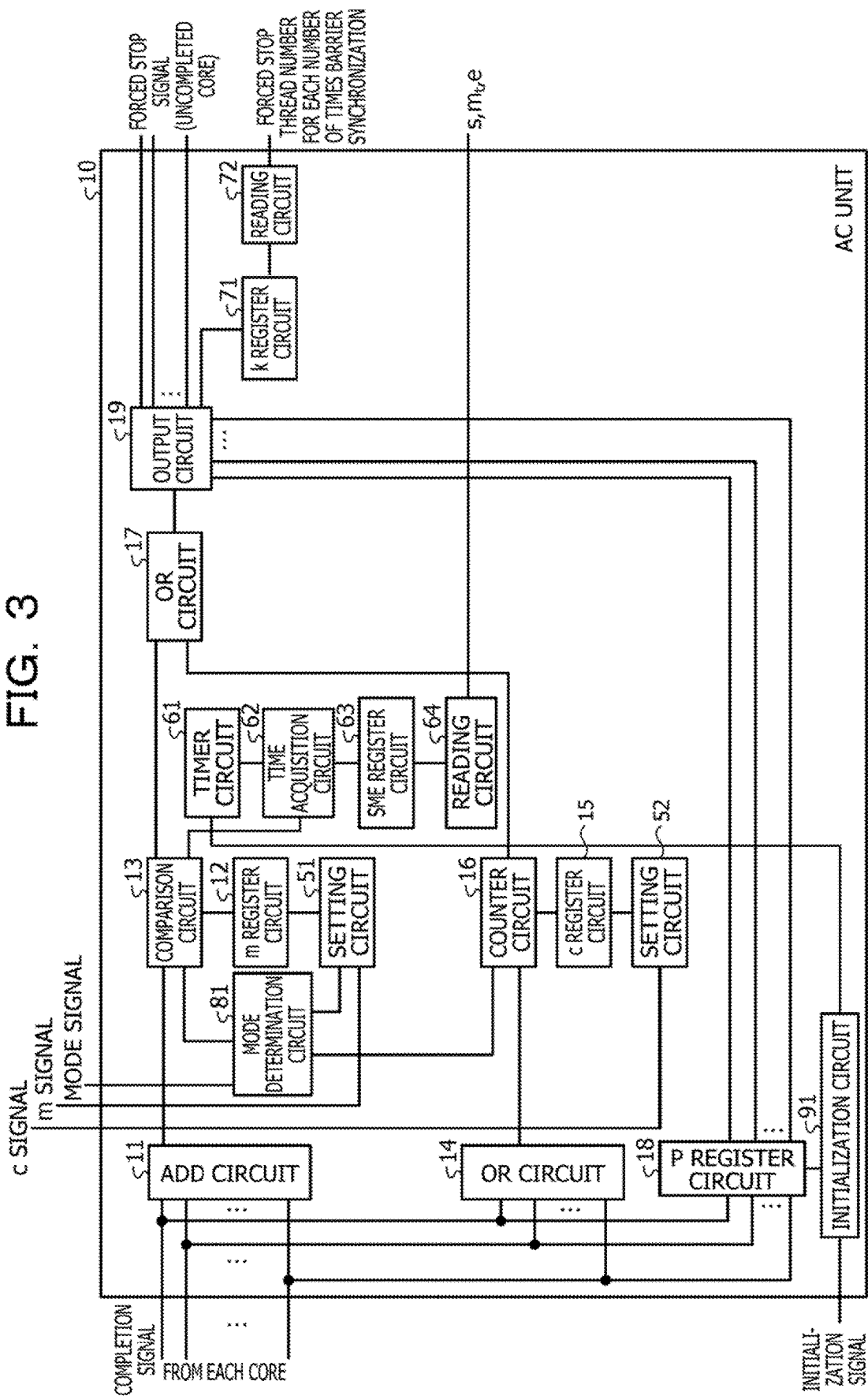
FIG. 3 is a diagram illustrating a configuration of an AC unit.

FIG. 3 is a diagram illustrating a configuration of the AC unit 10. As illustrated in FIG. 3, the AC unit 10 includes an ADD circuit 11, an m register circuit 12, a comparison circuit 13, an OR circuit 14, a c register circuit 15, a counter circuit 16, an OR circuit 17, a P register circuit 18, and an output circuit 19. Further, the AC unit 10 includes a setting circuit 51, a setting circuit 52, a timer circuit 61, a time acquisition circuit 62, an SME register circuit 63, a reading circuit 64, a k register circuit 71, a reading circuit 72, a mode determination circuit 81, and an initialization circuit 91.

The ADD circuit 11 inputs a completion signal to be set to 1 when each core 20 completes the process of the thread, and outputs the number of 1 of the completion signal. When the process of the thread is not completed, each core 20 sets the completion signal to 0. The m register circuit 12 stores a threshold value m. The threshold value m is designated by a program. However, the threshold value m may be determined by the setting circuit 51 as described later.

The comparison circuit 13 compares the number output from the ADD circuit 11 with the threshold value m stored in the m register circuit 12, and outputs 1 to the OR circuit 17 when the number output from the ADD circuit 11 becomes equal to or greater than the threshold value m. When the mode signal indicates 0 or 2, n is set in the m register circuit 12. Here, the mode signal is a signal for designating a mode. The value indicated by the mode signal is determined by the mode determination circuit 81, Further, when the mode signal indicates 2, the comparison circuit 13 outputs 1 to the time acquisition circuit 62 when the number output from the ADD circuit 11 is 1, m, or n.

The OR circuit 14 inputs the completion signals and outputs a logical sum of the completion signals. The c register circuit 15 stores a threshold value c. The threshold value c is designated by a program. However, the threshold value c may be determined by the setting circuit 52 as described later.

When the mode signal indicates 1, the counter circuit 16 starts counting of the clock when the output of the OR circuit 14 is 1. Then, the counter circuit 16 compares the counted value with the threshold value c stored in the c register circuit 15, and outputs 1 to the OR circuit 17 when the counted value is the threshold value c.

The OR circuit 17 outputs a logical sum of the output of the comparison circuit 13 and the output of the counter circuit 16. The P register circuit 18 stores the completion signal output from the core 20 for each core 20.

When the output of the OR circuit 17 is 1, the output circuit 19 transmits the forced stop signal to the core 20 where the process is not completed based on the P register circuit 18. The output circuit 19 may transmit an estimated value of a process result together with the forced stop signal. For example, the AC unit 10 stores past execution results and an average value of the execution results, and the output circuit 19 transmits the average value of the past execution results as the estimated value.

Further, the output circuit 19 accumulates the number of the thread instructed to be forcibly stopped in the k register circuit 71 in association with the number of times of barrier synchronization. For example, the output circuit 19 specifies the thread number from the P register circuit 18 by storing the thread number notified from each core 20 in association with the core 20.

The setting circuit 51 inputs the m signal and sets the threshold value m in the m register circuit 12. Here, the m signal is a signal indicating the threshold value m. When the mode signal indicates 0 or 2, the setting circuit 51 sets the number n of cores 20 in the m register circuit 12 based on an instruction from the mode determination circuit 81.

The setting circuit 52 inputs the c signal and sets the threshold value c in the c register circuit 15. Here, the c signal is a signal indicating the threshold value c.

The timer circuit 61 counts a time under barrier synchronization. Upon receiving 1 from the comparison circuit 13, the time acquisition circuit 62 acquires the time from the timer circuit 61 and stores the time in the SME register circuit 63. The SME register circuit 63 stores the time s, the time $m_t$, and the time e. The reading circuit 64 outputs the time s, the time $m_t$, and the time e from the SME register circuit 63.

The k register circuit 71 stores the number of the thread to which the output circuit 19 instructs the forced stop as the forced stop thread number in association with the number of times of the barrier synchronization. The reading circuit 72 reads the forced stop thread number for each number of times from the k register circuit 71 and outputs the forced stop thread number.

The mode determination circuit 81 inputs the mode signal and determines a value indicated by the mode signal. Then, when the value indicated by the mode signal is 1, the mode determination circuit 81 operates the counter circuit 16. Further, when the value indicated by the mode signal is 0 or 2, the mode determination circuit 81 instructs the setting circuit 51 to set n in the m register circuit 12. Further, when the value indicated by the mode signal is 2, the mode determination circuit 81 notifies comparison circuit 13 that the mode is 2.

The initialization circuit 91 inputs an initialization signal, initializes the P register circuit 18 by 0, and starts the timer circuit 61. The initialization signal is generated when the parallel process of the threads is started.

FIG. 4A to 4B is a diagram illustrating an example of a program for designating the AC parallelization. FIG. 4A illustrates a program for which the AC parallelization is not designated, and FIG. 4B illustrates a program for which the AC parallelization is designated. As illustrated in FIG. 4B, the threshold value m and the threshold value c are designated by the set_AC_parameter (m, c). Further, the location and mode of the AC parallelization are designated by start_AC_region (mode) and end_AC_region (mode). Further, the time s, the time $m_t$, and the time e are acquired by get_AC_value (&S, &M, &E).

Further, the m signal and the c signal are generated by the set_AC_parameter (m, c), and the threshold value m and the threshold value c are set in the m register circuit 12 and the c register circuit 15 based on the m signal and the e signal. Further, the mode signal and the initialization signal are generated by start_AC_region (mode), the P register circuit 18 is initialized based on the initialization signal, and the timer circuit 61 is started.

Figure 6:
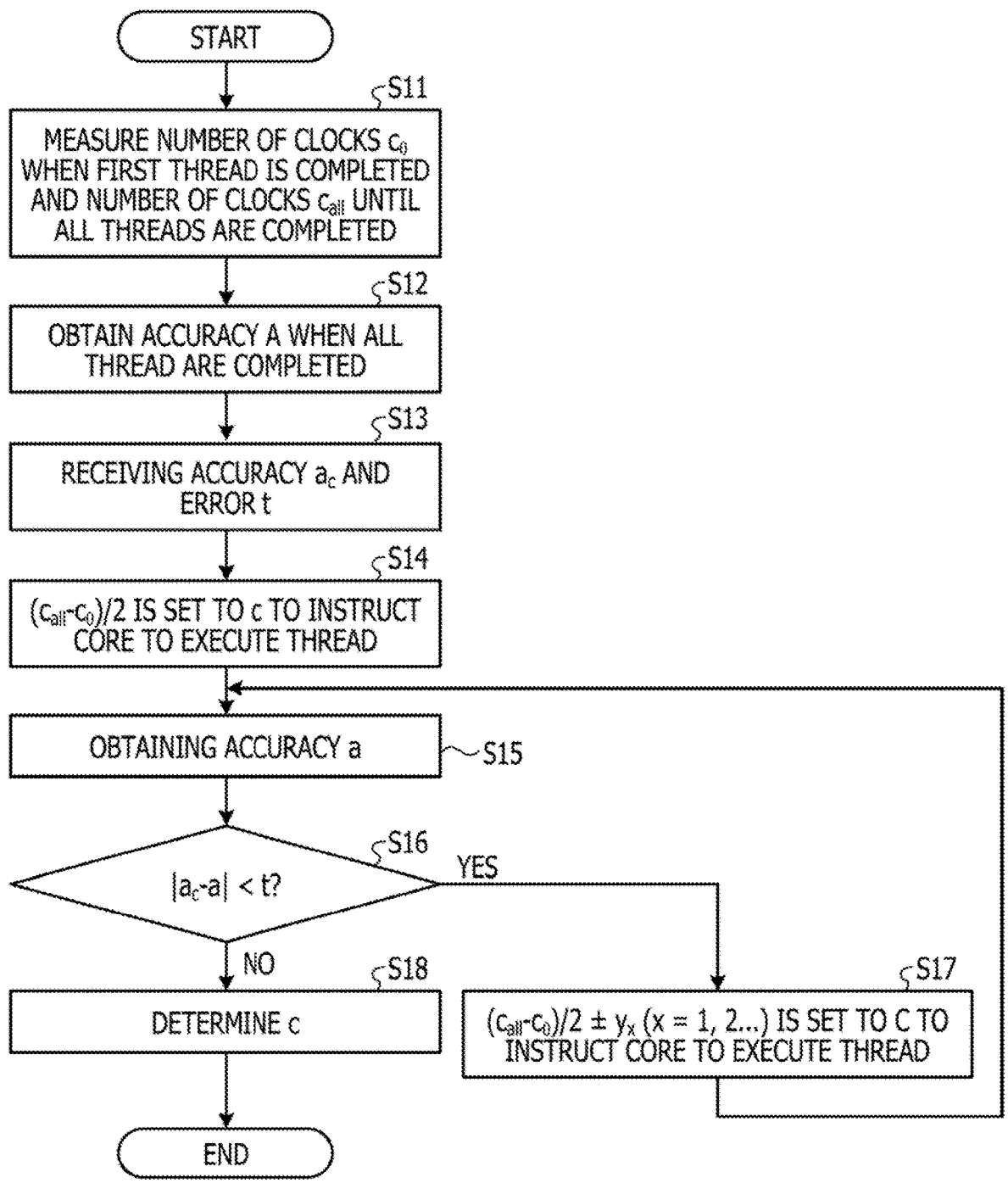
FIG. 6 is a flowchart illustrating a flow of a process in which the setting circuit determines a threshold value c.
Figure 7:
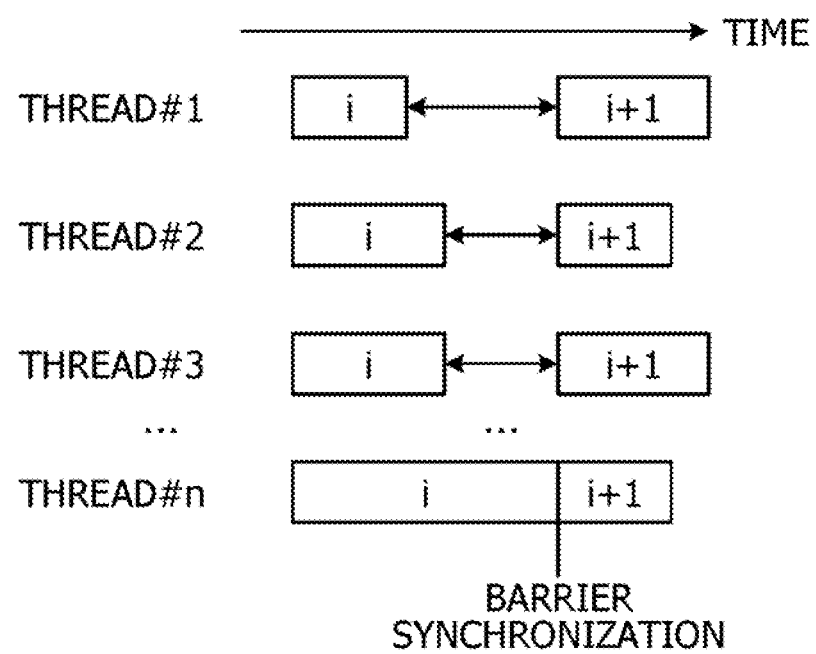
FIG. 7 is a diagram for explaining barrier synchronization.

Instead of designating the threshold value m and the threshold value c by a program, the setting circuit 51 and the setting circuit 52 may determine the threshold value m and the threshold value c, respectively. FIG. 5 is a flowchart illustrating a flow of process in which the setting circuit 51 determines the threshold value m, and FIG. 6 is a flowchart illustrating a flow of process in which the setting circuit 52 determines the threshold value c.

As illustrated in FIG. 5, the setting circuit 51 sets n to m, instructs the core 20 to execute the thread (step S1), and acquires an accuracy A (step S2). Then, the setting circuit 51 receives an accuracy $a_c$ and an error t (step S3). Here, $a_c$ is an expected accuracy and $a_c$<A. Also, t is an error with $a_c$ and is an error capable of securing an expected accuracy. Then, the setting circuit 51 sets n/2 to m, instructs the core 20 to execute the thread (step S4), and acquires the accuracy a (step S5).

Then, the setting circuit 51 determines whether or not an absolute value of a difference between $a_c$ and a is smaller than t (step S6), If the absolute value of the difference is smaller than t, the setting circuit 51 sets a value obtained by adding $y_x$ to n/2 or a value obtained by subtracting $y_x$ from n/2 to m and instructs the core 20 to execute the thread (step S7). Here, x is the number of times step S7 is executed. Further, $y_x$ is $n/2^{x+1}$, For example, $y_1$ is $(n-m)/2=n/2^2$, and $y_2$ is $n/2^3$. Further, when $a≥a_c$, the setting circuit 51 sets a value obtained by adding $y_x$ to n/2 to m, and when $a<a_c$, sets a value obtained by subtracting $y_x$ from n/2 to m. Then, the setting circuit 51 returns to step S5.

On the other hand, when the absolute value of the difference between $a_c$ and a is not smaller than t, the setting circuit 51 determines m as a current value (step S8).

As described above, since the setting circuit 51 determines the threshold value m, the AC unit 10 may optimize the AC parallelization function. The process illustrated in FIG. 5 may be performed by an apparatus external to the AC unit 10, and the AC unit 10 may receive the threshold value m determined by the external apparatus.

As illustrated in FIG. 6, the setting circuit 52 measures the number of clocks $c_0$ at the time of completion of the first thread and the number of clocks $c_{all}$ at the time of completion of all threads (step S11), and acquires the accuracy A in the case of completion of all threads (step S12). Then, the setting circuit 52 receives the accuracy $a_c$ and the error t (step S13). Then, the setting circuit 52 sets $(c_{all}-c_0)/2$ to c, instructs the core 20 to execute the thread (step S14), and acquires the accuracy a (step S15).

Then, the setting circuit 52 determines whether or not the absolute value of the difference between ac and a is smaller than t (step S16). Then, when the absolute value of the difference between $a_c$ and a is smaller than t, the setting circuit 52 sets a value obtained by adding $y_x$ to $(c_{all}-c_0)/2$ or a value obtained by subtracting $y_x$ from $(c_{all}-c_0)/2$ to c, and instructs the core 20 to execute the thread (step S17). Here, x is the number of times step S17 is executed. Also, $y_x$ is $(c_{all}-c_0)/2^{x+1}$. For example, $y_1$ is $(c_{all}-c_0)/2^2$ and $y_2$ is $(c_{all}-c_0)/2^3$. Further, when $a≥a_c$, the setting circuit 52 sets a value obtained by adding $y_x$ to $(c_{all}-c_0)/2$ to c, and when $a<a_c$, sets a value obtained by subtracting $y_x$ from $(c_{all}-c_0)/2$ to c. Then, the setting circuit 52 returns to step S15.

On the other hand, when the absolute value of the difference between $a_c$ and a is not smaller than t, the setting circuit 52 determines c as the current value (step S18).

As described above, since the setting circuit 51 determines the threshold value c, the AC unit 10 may optimize the AC parallelization function. The process illustrated in FIG. 6 may be performed by an apparatus external to the AC unit 10, and the AC unit 10 may receive the threshold value c determined by the external apparatus.

As described above, in the embodiment, the comparison circuit 13 compares the number of the cores 20, in which the process is completed, with the threshold value m, and determines whether or not the number of the cores 20 where the process is completed is equal to or greater than the threshold value m. Then, when the number of the cores 20 where the process is completed is equal to or greater than the threshold value m, the output circuit 19 transmits the forced stop signal to the cores 20 where the process is not completed. Therefore, the AC unit 10 may reduce the waiting time in the barrier synchronization and improve the processing speed.

Further, in the embodiment, when the mode is 1, the counter circuit 16 determines whether or not the elapsed time since any one of the cores 20 completes the process for the first time is equal to or greater than the threshold value c. Then, when the elapsed time since any one of the cores 20 completes the process for the first time is equal to or greater than the threshold value c, the output circuit 19 transmits the forced stop signal to the core 20 where the process is not completed. Therefore, the AC unit 10 may reduce the waiting time in the barrier synchronization and improve the processing speed.

Further, in the embodiment, the mode determination circuit 81 determines the mode and instructs the setting circuit 51 to operate the counter circuit 16 when the mode is 1 and to set n to the m register circuit 12 when the mode is 0 or 2. Further, when the mode is 2, the mode determination circuit 81 notifies the comparison circuit 13 that the mode is 2. Therefore, the mode determination circuit 81 may control the operation of the AC unit 10 based on the mode.

Further, in the embodiment, the m register circuit 12 stores the threshold value m, and the setting circuit 51 determines the optimum value of the threshold value m and sets the optimum value in the m register circuit 12. Further, the comparison circuit 13 compares the threshold value m stored in the m register circuit 12 with the number of cores 20 to which the completion is notified, Therefore, the AC unit 10 may optimize the AC parallelization function.

Further, in the embodiment, the c register circuit 15 stores the threshold value c, and the setting circuit 52 determines the optimum value of the threshold value c and sets the optimum value in the c register circuit 15. Further, the counter circuit 16 compares the threshold value c stored in the c register circuit 15 with the elapsed time since the completion notification of the process is received for the first time. Therefore, the AC unit 10 may optimize the AC parallelization function.

Further, in the embodiment, the k register circuit 71 stores the forced stop thread number in association with the number of times of the barrier synchronization, and the reading circuit 72 reads and outputs the forced stop thread number and the number of times from the k register circuit 71. Therefore, the AC unit 10 may provide information useful for analysis of the AC parallelization function.

Further, in the embodiment, the output circuit 19 transmits the estimated value of the processing result of the thread to the thread instructed to be forcibly stopped, and thus the AC unit 10 may provide the AC parallelization function without reducing the number of threads.

Further, in the embodiment, the SME register circuit 63 stores the time s, the time $m_t$, and the time e, and the reading circuit 64 reads and outputs the time s, the time $m_t$, and the time e from the SME register circuit 63. Therefore, the AC unit 10 may provide information useful for analysis of the AC parallelization function.

In the embodiment, the case where the thread is allocated to the core 20 is described. However, instead of the thread, another processing unit such as a process may be allocated to the core 20. Alternatively, a thread may be assigned to another processing apparatus such as a processor or a CPU instead of the core 20. When a thread is allocated to a CPU, the parallel information processing apparatus includes a plurality of CPUs, and the AC unit is provided outside the CPUs.

Further, in the embodiment, when the mode is 1, a case where both the comparison circuit 13 and the counter circuit 16 operate is described, but the case where the mode is 1 may be subdivided. For example, 3 modes, that is, a mode in which only the comparison circuit 13 operates, a mode in which only the counter circuit 16 operates, and a mode in which both the comparison circuit 13 and the counter circuit 16 operate, may be provided.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a illustrating of the superiority and inferiority of the invention. Although one or more examples of the present invention have been described in detail, it should be understood that the various changes, substitutions, and alterations could be made hereto without departing from the spirit and scope of the invention.

What is claimed is:

1. A barrier synchronization circuit that performs barrier synchronization of a plurality of processes executed in parallel by a plurality of processing circuits, the barrier synchronization circuit comprising:
   a first determination circuit configured to determine whether a first number of first processing circuits among the plurality of processing circuits is equal to or greater than a first threshold value, the first processing circuits having completed the respective processes;
   an instruction circuit configured to instruct a second processing circuit among the plurality of the processing circuits to stop the respective processes when it is determined that the first number is equal to or greater than the first threshold value by the first determination circuit, the second processing circuit having not completed the respective processes;
   a threshold value storage circuit configured to store one or more threshold value including the first threshold value; and
   a setting circuit configured to:
      instruct all of the plurality of processing circuits to execute the plurality of processes;
      acquire a first accuracy in a case where all of the plurality of processes are executed by the plurality of processing circuits;
      acquire a second accuracy expected for the barrier synchronization circuit and an error which is an error with respect to the second accuracy and secures the second accuracy;
      instruct fourth processing circuits in which a third number of the fourth processing circuits is smaller than a second number of the plurality of processing circuits to execute the plurality of processes;
      acquire a third accuracy in a case where the plurality of processes are executed by the fourth processing circuits;
      determine whether an absolute value of a difference between the second accuracy and the third accuracy is smaller than the error;
      when the absolute value is smaller than the error, repeat a process in which a fourth number is obtained by adding a specific value to the third number of the fourth processing circuits or by subtracting the specific value from the third number of the fourth processing circuits and a fifth processing circuits in which a number of the fifth processing circuits is the fourth number are instructed to execute the plurality of processes until the absolute value becomes equal to or greater than the error; and when the absolute value becomes equal to or greater than the error, set the fourth number as the first threshold value in the threshold value storage circuit, the first determination circuit performs determination of the first number of first processing circuits based on the set first threshold value.

2. A barrier synchronization circuit that performs barrier synchronization of a plurality of processes executed in parallel by a plurality of processing circuits, the barrier synchronization circuit comprising:

a first determination circuit configured to determine whether an elapsed time since any one of the processing circuits completes the respective processes for a first time is equal to or greater than a first threshold value;

an instruction circuit configured to, when it is determined that the elapsed time is equal to or greater than the first threshold value by the first determination circuit, instruct a processing circuit among the plurality of processing circuits to stop the respective processes, the processing circuit does not complete the respective processes;

a threshold value storage circuit configured to store one or more threshold value including the first threshold value; and a setting circuit configured to:

measure a first number of clocks at a time of completion of a first process of the plurality of processes and a second number of clocks at a time of completion of all of the plurality of processes;

acquire a first accuracy at the time of completion of all of the plurality of processes;

acquire a second accuracy expected for the barrier synchronization circuit and an error which is an error with respect to the second accuracy and secures the second accuracy;

instruct the plurality of processing circuits to execute the plurality of processes;

acquire a third accuracy at a time at which a third number of clocks smaller than a difference between the first number of clocks and the second number of clocks elapses;

determine whether an absolute value of a difference between the second accuracy and the third accuracy is smaller than the error;

when the absolute value is smaller than the error, repeat a process in which a fourth number of clocks is obtained by adding a specific value to the third number of clocks or by subtracting the specific value from the third number of clocks and the plurality of processing circuits are instructed to execute the plurality of processes until the absolute value becomes equal to or greater than the error; and when the absolute value becomes equal to or greater than the error, set the fourth number of clocks as the first threshold value in the threshold value storage circuit, the first determination circuit performs determination of the first number of first processing circuits based on the set first threshold value.

3. The barrier synchronization circuit according to claim 1, further comprising:

a second determination circuit configured to determine whether an elapsed time since any one of the processing circuits completes the respective processes for the first time is equal to or greater than a second threshold value, wherein the instruction circuit instructs a third processing circuit among the plurality of processing circuits to stop the respective processes when it is determined that the elapsed time is equal to or greater than the second threshold value by the second determination circuit, the third processing circuit having not completed the respective processes in the elapsed time.

4. The barrier synchronization circuit according to claim 3, further comprising a third determination circuit configured to determine value of mode that designates an operation of the barrier synchronization, and to operate the second determination circuit when the value is a specific value.

5. The barrier synchronization circuit according to claim 1, further comprising:

an identifier storage circuit configured to store an identifier in units of process in which the process is executed by the second processing circuit, in association with a number of times of barrier synchronization; and a first output circuit configured to output the identifier and the number of times stored in the identifier storage circuit.

6. The barrier synchronization circuit according to claim 1, wherein the instruction circuit transmits a result expected in a case where the process is completed when the stop of the process is instructed, and instructs execution of a next process of the plurality of processes.

7. The barrier synchronization circuit according to claim 3, further comprising:

a time storage circuit configured to store a time at which any one of the processing circuits completes the respective processes for the first time, a time at which the processing circuits of the first number equal to or greater than the first threshold value complete the respective processes, and a time at which the processing circuit completes the respective processes; and a second output circuit configured to output the time stored in the time storage circuit.

8. A barrier synchronization method for performing barrier synchronization of a plurality of processes executed in parallel by a plurality of processing circuits in a barrier synchronization circuit, the barrier synchronization method comprising:

determining whether a first number of first processing circuits among the plurality of the processing circuits which completes the respective processes is equal to or greater than a first threshold value the first processing circuits having completed the process;

instructing a second processing circuit among the plurality of the processing circuits to stop the respective processes when it is determined that the first number is equal to or greater than the first threshold value, the second processing circuit having not completed the respective processes;

storing one or more threshold value including the first threshold value;

instructing all of the plurality of processing circuits to execute the plurality of processes;

acquiring a first accuracy in a case where all of the plurality of processes are executed by the plurality of processing circuits;

acquiring a second accuracy expected for the barrier synchronization circuit and an error which is an error with respect to the second accuracy and secures the second accuracy;
instructing fourth processing circuits in which a third number of the fourth processing circuits is smaller than a second number of the plurality of processing circuits to execute the plurality of processes;
acquiring a third accuracy in a case where the plurality of processes are executed by the fourth processing circuits;
determining whether an absolute value of a difference between the second accuracy and the third accuracy is smaller than the error;
when the absolute value is smaller than the error, repeating a process in which a fourth number is obtained by adding a specific value to the third number of the fourth processing circuits or by subtracting the specific value from the third number of the fourth processing circuits and a fifth processing circuits in which a number of the fifth processing circuits is the fourth number are instructed to execute the plurality of processes until the absolute value becomes equal to or greater than the error; and
when the absolute value becomes equal to or greater than the error, setting the fourth number as the first threshold value in the threshold value storage circuit,
performing determination of the first number of first processing circuits based on the set first threshold value.

9. A barrier synchronization method for performing barrier synchronization of a plurality of processes executed in parallel by a plurality of processing circuits in a barrier synchronization circuit, the barrier synchronization method comprising:
determining whether an elapsed time since any one of the processing circuits completes the respective processes for a first time is equal to or greater than a first threshold value;
when it is determined that the elapsed time is equal to or greater than the first threshold value, instructing a processing circuit among the plurality of processing circuits to stop the respective processes, the processing circuit does not complete the respective processes;
storing one or more threshold value including the first threshold value;
measuring a first number of clocks at a time of completion of a first process of the plurality of processes and a second number of clocks at a time of completion of all of the plurality of processes;
acquiring a first accuracy at the time of completion of all of the plurality of processes;
acquiring a second accuracy expected for the barrier synchronization circuit and an error which is an error with respect to the second accuracy and secures the second accuracy;
instructing the plurality of processing circuits to execute the plurality of processes;
acquiring a third accuracy at a time at which a third number of clocks smaller than a difference between the first number of clocks and the second number of clocks elapses;
determining whether an absolute value of a difference between the second accuracy and the third accuracy is smaller than the error;
when the absolute value is smaller than the error, repeating a process in which a fourth number of clocks is obtained by adding a specific value to the third number of clocks or by subtracting the specific value from the third number of clocks and the plurality of processing circuits are instructed to execute the plurality of processes until the absolute value becomes equal to or greater than the error; and
when the absolute value becomes equal to or greater than the error, setting the fourth number of clocks as the first threshold value in the threshold value storage circuit, and
performing determination of whether the elapsed time is equal to or greater than the first threshold value based on the set first threshold value.

10. A parallel information processing apparatus, comprising:
a determination circuit configured to determine whether a first number of first processing circuits among a plurality of the processing circuits is equal to or greater than a first threshold value, the first processing circuits having completed the respective processes;
an instruction circuit configured to instruct a second processing circuit among the plurality of the processing circuits to stop the respective processes when it is determined that the first number is equal to or greater than the first threshold value by the first determination circuit, the second processing circuit having not completed the respective processes;
a threshold value storage circuit configured to store one or more threshold value including the first threshold value; and
a setting circuit configured to:
instruct all of the plurality of processing circuits to execute the plurality of processes;
acquire a first accuracy in a case where all of the plurality of processes are executed by the plurality of processing circuits;
acquire a second accuracy expected for the parallel information processing apparatus and an error which is an error with respect to the second accuracy and secures the second accuracy;
instruct fourth processing circuits in which a third number of the fourth processing circuits is smaller than a second number of the plurality of processing circuits to execute the plurality of processes;
acquire a third accuracy in a case where the plurality of processes are executed by the fourth processing circuits;
determine whether an absolute value of a difference between the second accuracy and the third accuracy is smaller than the error;
when the absolute value is smaller than the error, repeat a process in which a fourth number is obtained by adding a specific value to the third number of the fourth processing circuits or by subtracting the specific value from the third number of the fourth processing circuits and a fifth processing circuits in which a number of the fifth processing circuits is the fourth number are instructed to execute the plurality of processes until the absolute value becomes equal to or greater than the error; and
when the absolute value becomes equal to or greater than the error, set the fourth number as the first threshold value in the threshold value storage circuit,
the determination circuit performs determination of the first number of first processing circuits based on the set first threshold value.

11. A parallel information processing apparatus, comprising:
- a determination circuit configured to determine whether an elapsed time since any one of the processing circuits completes the respective processes for the first time is equal to or greater than a first threshold value;
- an instruction circuit configured to, when it is determined that the elapsed time is equal to or greater than the first threshold value by the first determination circuit, instruct a processing circuit among the plurality of processing circuits to stop the respective processes, the processing circuit does not complete the process respective processes;
- a threshold value storage circuit configured to store one or more threshold value including the first threshold value; and
- a setting circuit configured to:
  - measure a first number of clocks at a time of completion of a first process of the plurality of processes and a second number of clocks at a time of completion of all of the plurality of processes;
  - acquire a first accuracy at the time of completion of all of the plurality of processes;
  - acquire a second accuracy expected for the barrier synchronization circuit and an error which is an error with respect to the second accuracy and secures the second accuracy;
  - instruct the plurality of processing circuits to execute the plurality of processes;
  - acquire a third accuracy at a time at which a third number of clocks smaller than a difference between the first number of clocks and the second number of clocks elapses;
  - determine whether an absolute value of a difference between the second accuracy and the third accuracy is smaller than the error;
  - when the absolute value is smaller than the error, repeat a process in which a fourth number of clocks is obtained by adding a specific value to the third number of clocks or by subtracting the specific value from the third number of clocks and the plurality of processing circuits are instructed to execute the plurality of processes until the absolute value becomes equal to or greater than the error; and
  - when the absolute value becomes equal to or greater than the error, set the fourth number of clocks as the first threshold value in the threshold value storage circuit,
- the determination circuit performs determination of whether the elapsed time is equal to or greater than the first threshold value based on the set first threshold value.

* * * * *